(12) United States Patent
Kemppainen et al.

(10) Patent No.: US 9,167,456 B2
(45) Date of Patent: Oct. 20, 2015

(54) SUBSCRIBER TERMINAL IDENTIFICATION

(71) Applicant: EXFO Oy, Oulu (FI)

(72) Inventors: Jukka Kemppainen, Tyrnävä (FI); Juha Lehtikangas, Kontio (FI)

(73) Assignee: EXFO OY, Oulu (FI)

( * ) Notice: Subject to any disclaimer, the term of this patent is extended or adjusted under 35 U.S.C. 154(b) by 0 days.

(21) Appl. No.: 14/079,140

(22) Filed: Nov. 13, 2013

(65) Prior Publication Data

US 2014/0134977 A1     May 15, 2014

(30) Foreign Application Priority Data

Nov. 14, 2012  (FI) ...................................... 20126197

(51) Int. Cl.

| | |
|---|---|
| H04M 1/66 | (2006.01) |
| H04W 4/00 | (2009.01) |
| H04W 36/00 | (2009.01) |
| H04B 7/00 | (2006.01) |
| H04W 24/06 | (2009.01) |
| H04L 29/06 | (2006.01) |
| H04W 12/02 | (2009.01) |
| H04W 12/08 | (2009.01) |

(52) U.S. Cl.
CPC ............. *H04W 24/06* (2013.01); *H04L 63/302* (2013.01); *H04W 12/02* (2013.01); *H04W 12/08* (2013.01)

(58) Field of Classification Search
CPC ...... H04W 36/20; H04W 36/30; H04W 36/16
USPC .................................. 455/410, 422, 436, 507
See application file for complete search history.

(56) References Cited

U.S. PATENT DOCUMENTS

| | | |
|---|---|---|
| 2008/0220777 A1 | 9/2008 | Kouadjo et al. |
| 2010/0273504 A1 | 10/2010 | Bull et al. |
| 2011/0151909 A1* | 6/2011 | Kumpula et al. ............. 455/507 |
| 2012/0252454 A1* | 10/2012 | Kumpula et al. ............. 455/436 |

FOREIGN PATENT DOCUMENTS

| | | |
|---|---|---|
| EP | 1 408 710 A1 | 4/2004 |
| EP | 2 134 121 A1 | 12/2009 |
| EP | 2 337 387 A1 | 6/2011 |
| WO | 2009/099362 A1 | 8/2009 |

OTHER PUBLICATIONS

Search Report dated Sep. 12, 2013 for Finnish Application No. 20126197.
European Search Report dated May 21, 2014 for Application No. EP 13 19 2253.
Beraldi, Roberto, et al., "A New Dynamic Reservation Multiple Access Protocol for Supporting Multimedia Traffic in Third Generation Cellular System", Singapore ICCS Conference Proceedings, vol. 1, Nov. 14, 1994, pp. 314-319.
Office Action dated Mar. 24, 2014 for Finnish Application No. 20126197.

* cited by examiner

*Primary Examiner* — Thomas Lett
(74) *Attorney, Agent, or Firm* — Ladas & Parry LLP (57) ABSTRACT

Subscriber terminal identification is disclosed. An apparatus controls a base station to form an emulated long term evolution LTE cell such that tracking area code and physical cell identity of the emulated LTE cell are unused by real neighboring LTE cells, and radio frequency power level of the emulated LTE cell within the emulated LTE cell is higher than the radio frequency power levels of the real neighboring LTE cells within the emulated LTE cell; and controls the base station to receive a connection request from a subscriber terminal residing in the emulated LTE cell, whereupon, in the ensuing exchange of messages, the base station is controlled to receive an international mobile subscriber identity from the subscriber terminal.

10 Claims, 5 Drawing Sheets

SUBSCRIBER TERMINAL IDENTIFICATION

FIELD

The invention relates generally to identifying a subscriber terminal in use and specifically to an apparatus, a method, and a computer-readable medium used for performing the identification.

BACKGROUND

Identifying a subscriber terminal is useful, when a criminal is using the subscriber terminal for communication, for example.

BRIEF DESCRIPTION

The present invention seeks to provide an improved apparatus, method, and computer readable medium.

According to an aspect of the present invention, there is provided an apparatus comprising one or more processors, and one or more memories including computer program code, the one or more memories and the computer program code configured to, with the one or more processors, cause the apparatus at least to perform: control a base station to form an emulated long term evolution LTE cell such that tracking area code and physical cell identity of the emulated LTE cell are unused by real neighbouring LTE cells, and radio frequency power level of the emulated LTE cell within the emulated LTE cell is higher than the radio frequency power levels of the real neighbouring LTE cells within the emulated LTE cell; and control the base station to receive a connection request from a subscriber terminal residing in the emulated LTE cell, whereupon, in the ensuing exchange of messages, the base station is controlled to receive an international mobile subscriber identity from the subscriber terminal.

According to another aspect of the present invention, there is provided a method comprising: forming an emulated long term evolution LTE cell such that tracking area code and physical cell identity of the emulated LTE cell are unused by real neighbouring LTE cells, and radio frequency power level of the emulated LTE cell within the emulated LTE cell is higher than the radio frequency power levels of the real neighbouring LTE cells within the emulated LTE cell; and receiving a connection request from a subscriber terminal residing in the emulated LTE cell, whereupon, in the ensuing exchange of messages, receiving an international mobile subscriber identity from the subscriber terminal.

According to another aspect of the present invention, there is provided a computer readable medium comprising a set of instructions, which, when executed on an apparatus cause the apparatus to perform: forming an emulated long term evolution LTE cell such that tracking area code and physical cell identity of the emulated LTE cell are unused by real neighbouring LTE cells, and radio frequency power level of the emulated LTE cell within the emulated LTE cell is higher than the radio frequency power levels of the real neighbouring LTE cells within the emulated LTE cell; and receiving a connection request from a subscriber terminal residing in the emulated LTE cell, whereupon, in the ensuing exchange of messages, receiving an international mobile subscriber identity from the subscriber terminal.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses 100, 110, 112, 114, 202 have been depicted as separate single entities, different parts may be implemented in one or more physical or logical entities.

If needed, more information on the Long Term Evolution (LTE) standard may be found in the following 3GPP specifications:

3GPP TS 36.104 v8.13.0 (2011-06): Base Station (BS) radio transmission and reception;

3GPP TS 36.214 V9.2.0 (2010-06): Physical layer Measurements;

3GPP TS 36.304 v9.3.0 (2010-06): User Equipment (UE) procedures in idle mode;

3GPP TS 36.305 v9.9.0 (2012-09): Stage 2 functional specification of User Equipment (UE) positioning in E-UTRAN;

3GPP TS 36.331 V9.4.0 (2010-09): RRC protocol; and

3GPP TS 24.301 V9.4.0 (2010-09): NAS protocol.

Figure 1:
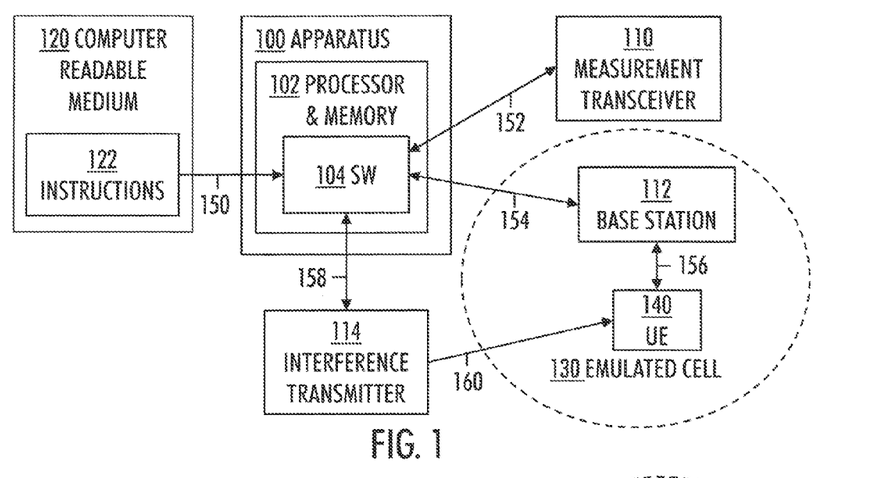
FIGS. 1, 2 and 3 are simplified diagrams illustrating various example embodiments of an apparatus.

FIG. 1 illustrates an example embodiment of an apparatus 100. The apparatus 100 may be any electronic apparatus capable of processing data as described in the following. A non-exhaustive list of the types of the apparatus 100 includes: an electronic digital computer, a desktop computer, a portable computer, a laptop computer, a tablet computer, a smartphone, a mobile phone, or any other electronic apparatus performing the identification. The apparatus 100 may employ an operating system such as Android, Microsoft Windows, Microsoft Windows Phone, Apple iOS, Apple Mac OS X, Linux, or Symbian, for example. Besides being a single apparatus 100, the apparatus 100 may be implemented in a distributed fashion employing communicatively coupled subunits.

The apparatus 100 comprises one or more processors 102 and one or more memories 102 including computer program code 104. The processor 102 and the memory 102 may be implemented by electronic circuitry.

The term 'processor' 102 refers to a physical device that is capable of processing data in a computer or other digital electronic device. Depending on the processing power needed, the apparatus 100 may comprise several processors 102 such as parallel processors or one or more multicore processors. A non-exhaustive list of implementation techniques for the processor 102 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

The term 'memory' 102 refers to a physical device that is capable of storing the computer program code 104 and data on a temporary or permanent basis for use in a computer or other digital electronic device. In an example embodiment, the term 'memory' refers to working memory (also known as primary storage, main memory or internal storage) directly accessible to the processor. In an example embodiment, the working memory may be implemented as a random-access memory (RAM), such as a dynamic RAM, DRAM.

The one or more memories 102 and the computer program code 104 are configured to, with the one or more processors 100, cause the apparatus 100 at least to perform: control 154 a base station 112 to form an emulated long term evolution LTE cell 130 such that tracking area code and physical cell identity of the emulated LTE cell 130 are unused by real neighbouring LTE cells, and radio frequency power level of the emulated LTE cell 130 within the emulated LTE cell 130 is higher than the radio frequency power levels of the real neighbouring LTE cells within the emulated LTE cell 130; and control 154 the base station 112 to receive a connection request 156 from a subscriber terminal 140 residing in the emulated LTE cell 130, whereupon, in the ensuing exchange of messages, the base station 112 is controlled 154 to receive an international mobile subscriber identity (IMSI) 156 from the subscriber terminal 140.

In an example embodiment, the one or more memories 102 and the computer program code 104 are further configured to, with the one or more processors 102, cause the apparatus 100 further to perform: control 154 the base station 112, in the ensuing exchange of the messages, to receive an international mobile equipment identity (IMEI) from the subscriber terminal 140.

In an example embodiment, the apparatus 100 may be of the type utilized in telecommunication testing and measurement. The apparatus 100 may be a measuring device. The apparatus 100 may be for instance a protocol simulator used for testing the operation of a data transmission system. The apparatus 100 may also be a computer provided with for instance Microsoft Windows® or some other operating system and dedicated protocol simulator software. The apparatus 100 may further comprise a number of other devices, such as a user interface and communication equipment. The user interface allows controlling the operations of the apparatus 100 and monitoring the operations carried out by the apparatus 100.

In an example embodiment, the apparatus 100 is utilized to identify a mobile subscriber terminal 140, i.e. a subscriber terminal 140 carried around by the user, or a subscriber terminal 140 being fixed to a vehicle, for example. Consequently, the apparatus 100 may also be mobile, i.e. being carried by a person following the user of the subscriber terminal 140, or being fixed to a vehicle following the user of the subscriber terminal 140 and/or the vehicle of the user.

The term 'base station' 112 refers to a Node B, enhanced or evolved NodeB (eNB), a home eNode B (HeNB), an access point (AP), an IEEE 802.11 based access point, a femto node, a femto base station, or any other equipment belonging to the network infrastructure of the radio system, and implementing the radio communication interface 156 with the subscriber terminal 140.

The term 'subscriber terminal' 140 refers to user equipment (UE), a radio terminal, a subscriber terminal, smartphone, mobile station, mobile phone, portable computer, pad computer, laptop, tablet, or some other type of wireless mobile communication device operating with or without a subscriber identification module (SIM). The subscriber terminal 140 may be a piece of equipment or a device that is configured to associate the terminal and its user with a subscription and allows a user to interact with the radio system, e.g. the subscriber terminal 140 is capable of requesting service from the radio system. The subscriber terminal 140 presents information to the user and allows the user to input information. In other words, the subscriber terminal 140 may be any terminal capable of wirelessly receiving information from and/or wirelessly transmitting information to the radio system. Besides communication capabilities, the subscriber 140 terminal may include computer functionalities or functionalities of other data processing devices.

Figure 5:
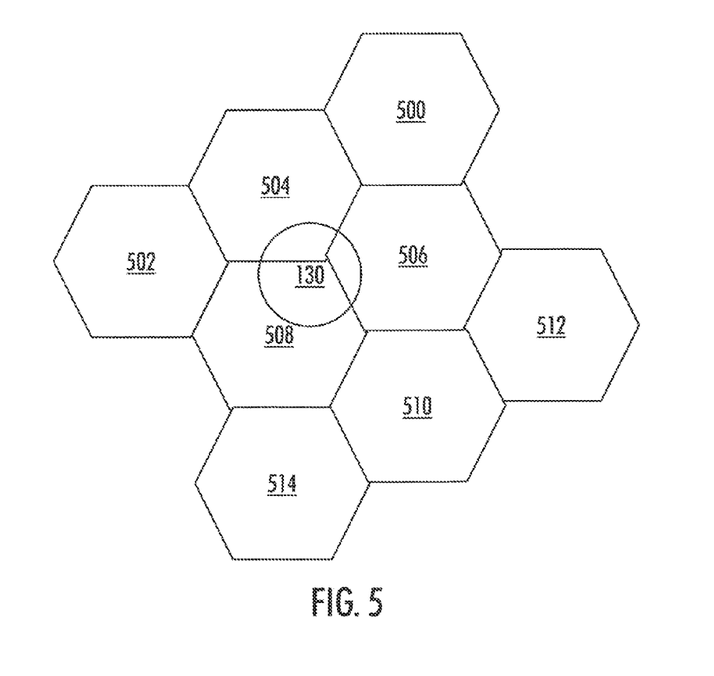
FIG. 5 illustrates example embodiments of cells.

In an example embodiment of the LTE, illustrated in FIG. 5, the real LTE cells 500, 502, 504, 506, 508, 510, 512, 514 form the radio coverage, which is illustrated (theoretically) with adjacent hexagons (which, in reality, overlap to a certain degree). ° Rear refers to the fact that the cellular radio system implementing the real LTE cells is authorized by the authorities and it provides continuous service for the users of the subscriber terminals 140. The emulated LTE cell 130 is overlaid with the real LTE cells; with real LTE cells 504, 506 and 508 in our example embodiment. In this context, 'emulated' refers to the fact that the emulated cell 130 is not a real authorized cell, but a fake cell that does not provide real service, although the emulated cell 130 duplicates (or emulates) a part of the functions of the real cell, so that the emulated behaviour of the emulated cell 130 closely resembles the behaviour of the real cell (as opposed to a computer simulation of an abstract model of the cell). In fact, the emulated cell 130 resembles the real cell to such a degree that the subscriber terminal 140 considers it real. As shown in FIG. 5, the range of the emulated LTE cell 130 may be smaller than the range of the normal real LTE cells 500-514.

In an example embodiment of the LTE, the number of the possible physical cell identities (PCI) may be 504. In our example embodiment, the real LTE cells 500-514 may have the physical cell identities 301-303 and 305-309, and the emulated LTE cell 130 has a physical cell identity that is unused by the real LTE cells 500-514, such as the physical cell identity 304, for example. The emulated LTE cell 304 may have a physical cell identity, which is not among those measured in the network, or listed in the blacklist ranges in system information block 4 or 5.

In GSM and UMTS technologies, the subscriber terminal 140 may make location area requests only to those cells, which have been listed as neighbour cells of the serving cell. In LTE, the subscriber terminal 140 may make tracking area update request to a cell with PCI value not listed in any neighbour list.

The described processing speeds up identity catching of the subscriber terminal 140 and, possibly, start-up of direction finding. In urgent cases, the apparatus 100 may be activated by selecting a random PCI value and a random TAC value, and in most cases, it may be without problems as the likelihood of an accidental overlap of the values is relatively small.

In an example embodiment illustrated in FIG. 1, the apparatus may be coupled 152 with a measurement transceiver 110. The measurement transceiver 110 may be implemented on a platform provided by a normal mobile telephone. The measurement features/parts may easily be implemented on top of the platform with suitable software and hardware components. All modifications and configurations required for implementing functionality may be performed as routines, which may be implemented as added or updated software routines, application circuits (ASIC) and/or programmable circuits, for example.

In an example embodiment, the one or more memories 102 and the computer program code 104 are further configured to, with the one or more processors 102, cause the apparatus 100 further to perform: control 152 the measurement transceiver 110 to measure radio frequency power levels of the real neighbouring LTE cells 500-514, and select radio frequency transmission power of the emulated LTE cell 130 on the basis of the measured radio frequency power levels of the real neighbouring LTE cells 500-514. The transmission power of the base station 112 is adjusted 154 such that the radio frequency power level of the emulated LTE cell 130 within the emulated LTE cell 130 is higher than the radio frequency power levels of the real neighbouring LTE cells 500-514 within the emulated LTE cell 130. As the operator of the apparatus 100 is preferably within an observation distance to the user of the subscriber terminal 140, the measured radio frequency power levels of the real neighbouring LTE cells 500-514 accurately enough reflect the reception power levels in the subscriber terminal 140, and, consequently, also the subscriber terminal 140 notices the emulated LTE cell 130.

In an example embodiment, the one or more memories 102 and the computer program code 104 are further configured to, with the one or more processors 102, cause the apparatus 100 further to perform: control 152 the measurement transceiver 110 to obtain network information of the real neighbouring LTE cells 500-514, and select the tracking area code and the physical cell identity of the emulated LTE cell 130 on the basis of the obtained network information of the real neighbouring LTE cells 500-514.

In an example embodiment, the one or more memories 102 and the computer program code 104 are further configured to, with the one or more processors 102, cause the apparatus 100 further to perform: control 152 the measurement transceiver 110 to obtain blacklist of physical cell identities, and select the physical cell identity of the emulated LTE cell 130 such that the selected physical cell identity of the emulated LTE cell 130 is not in the blacklist of the physical cell identities.

In an example embodiment illustrated in FIG. 1, the apparatus may be coupled 158 with an interference transmitter 114. The signal 160 transmitted by the interference transmitter 114 interferes with the signals transmitted by the real LTE base station so that the transmission power for the signal 156 of the base station 112 may be kept sufficiently low in order to minimize the harm caused by the base station 112 to innocent users. In an example embodiment, the one or more memories 102 and the computer program code 104 are further configured to, with the one or more processors 102, cause the apparatus 100 further to perform: control 158 the interference transmitter 114 to interfere 160 the real neighbouring LTE cells 500-514 so that the subscriber terminal 140 is caused to measure reception of the base station 112 forming the emulated LTE cell 130 as being better than reception of the real neighbouring LTE cells 500-514.

Figure 2:
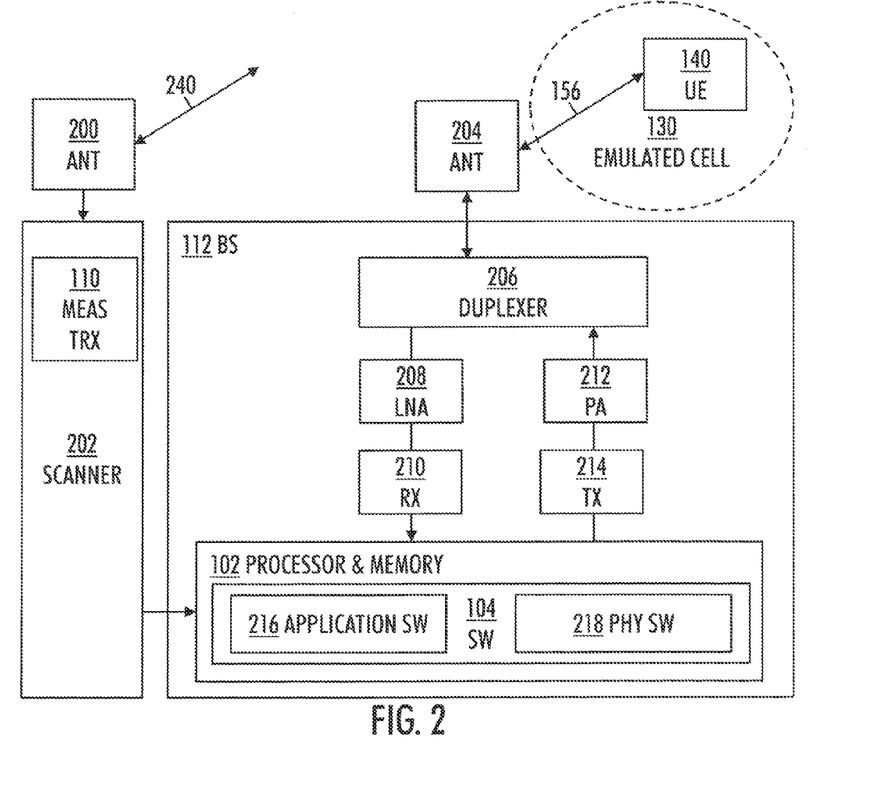

As illustrated in FIG. 2, the functionalities of the apparatus 100 and the base station 112 may be combined. The emulated base station 112 includes radio frequency components: a receiver 210, a transmitter 214, a duplexer 206, a low noise amplifier (LNA) 208 for the receiver 210, and a power amplifier (PA) 212 for the transmitter 214.

The base station 112 also includes the one or more processors 102 and the one or more memories 102.

As illustrated in FIG. 2, the computer program code 104 may be implemented by suitable software. In an example embodiment, the computer program code 104 comprises application software 216 and physical layer software 218 as separate software entities communicating with each other. The application software 216 may control the physical layer software 218, implement the needed protocols above the physical layer, and implement an IMSI (and IMEI) catch function (and possibly a direction finding function).

The base station 112 may be connected to an external antenna 204.

The user equipment 140 communicates 156 via a radio (or air) interface with the base station 112.

A scanner device 202 scans 240 the radio frequencies and provides information (such as a physical cell identifier (PCI), a tracking area code (TAC), blacklists, a mobile network code (MNC), a mobile country code (MCC), a power level) about the existing cells of cellular network. The scanner 202 has either an internal or external antenna 200. The application software 216 utilizes the information gathered by the scanner 202. As shown in FIG. 2, the scanner 202 may include the functionality of the measurement transceiver 110.

Naturally, the described distribution of functionality between the scanner 202 and the base station 112 is just one example embodiment, as the apparatus 100 functionality may be distributed based on the system requirements.

Figure 3:
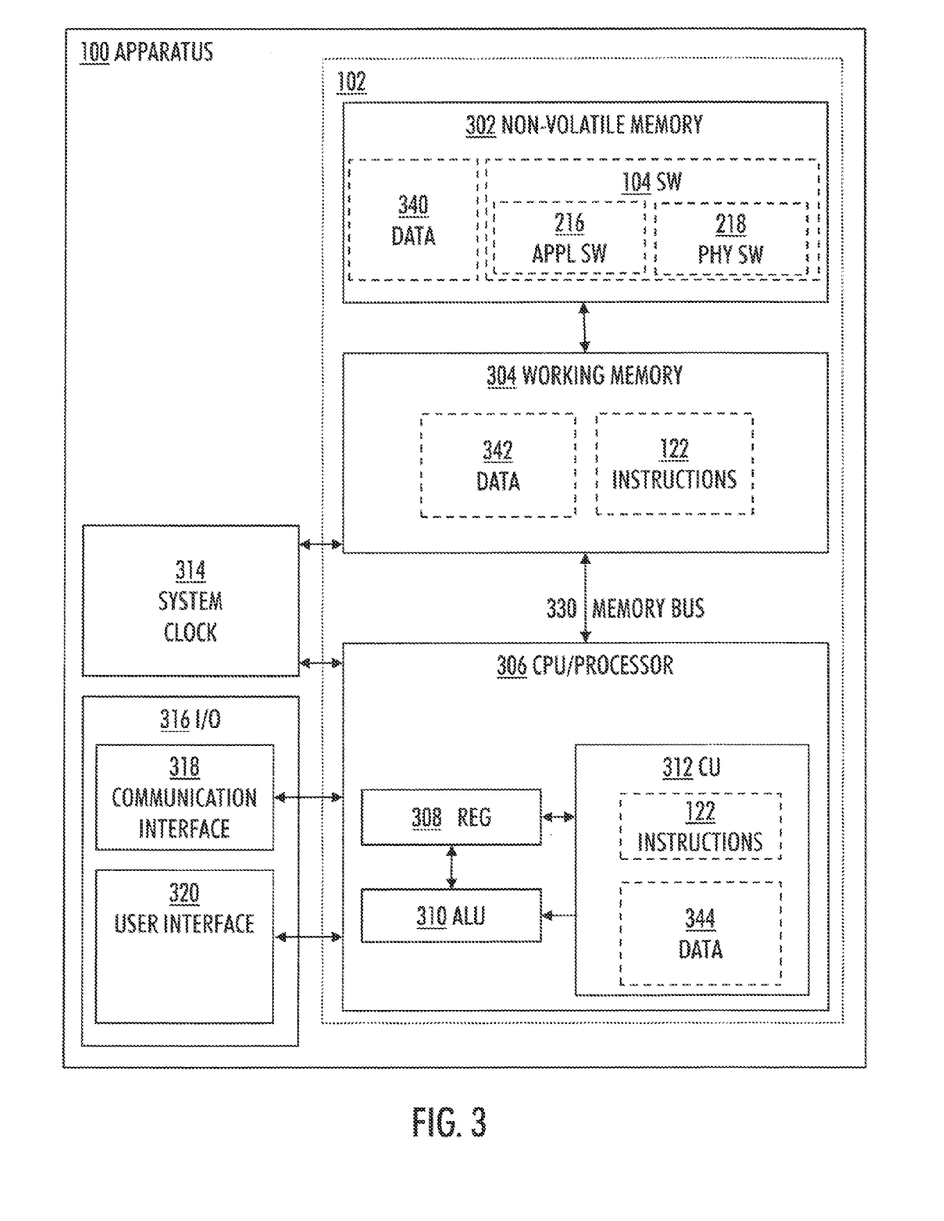

In an example embodiment illustrated in FIG. 3, the apparatus 100 may be an electronic digital computer, which may comprise a non-volatile memory 302, a working memory 304, a processor 306, a system clock 314 and an input/output 316 including a communication interface 318 and a user interface 320. Naturally, the computer may comprise a number of other peripheral devices, not illustrated here for the sake of clarity.

In an example embodiment, the system clock 314 constantly generates a stream of electrical pulses, which cause the various transferring operations within the computer to take place in an orderly manner and with specific timing.

In an example embodiment, the processor 306 may be implemented as a microprocessor implementing functions of a central processing unit (CPU) on an integrated circuit. The CPU 306 is a logic machine executing a computer program 104, which comprises program instructions 120. The computer program 104 may be coded as a computer program using a programming language, which may be a high-level programming language, such as C, C++, or Java, or a low-level programming language, such as a machine language, or an assembler. There are many ways to structure the program 104. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

The CPU 306 may comprise a set of registers 308, an arithmetic logic unit (ALU) 310, and a control unit (CU) 312. The control unit 312 is controlled by a sequence of instructions 120 transferred to the CPU 306 from the working memory 304. The working memory 304 is directly or indirectly connected to the CPU 306 via a memory bus 330 including two buses: an address bus and a data bus. The CPU 306 sends a memory address indicating the desired location of data (=data 342 and instructions 120) number through the address bus, whereupon the CPU 306 reads or writes the data 342, 122, 344 from/to the working memory 304 using the data bus.

The control unit 312 may contain a number of microinstructions for basic operations. The implementation of the microinstructions may vary, depending on the CPU design. The microprocessor 306 may also have an operating system (such as general-purpose operating system, a dedicated operating system of an embedded system, or a real-time operating system), which may provide the computer program 104 with system services. During running of the program 104, the instructions 122 are transferred via the memory bus 330 from the working memory 304 into the control unit 312, wherein usually a portion of the instructions 122 resides and controls the operation.

In an example embodiment, the non-volatile memory 302 retains the stored information even when not powered. Examples of non-volatile memory include read-only memory (ROM), flash memory, magnetic computer storage devices such as hard disk drives, and optical discs. As is shown in FIG. 3, the non-volatile memory 302 may store both data 340 (such as settings data, information on targeted subscriber terminals etc.) and the computer program 104 comprising the instructions 122.

An example embodiment, illustrated in FIG. 1, provides a computer readable medium 120 comprising the set of the instructions 122, which, when executed on the apparatus 100 cause the apparatus 100 to perform the required operations. In an example embodiment, the instructions 122 may be in source code form, object code form, or in some intermediate form. The computer-readable medium 120 may comprise at least the following: any entity or device capable of carrying 150 the instructions 122 to the apparatus 100, a record medium, a computer memory, a read-only memory, an electrical carrier signal, a telecommunications signal, and a software distribution medium. In some jurisdictions, depending on the legislation and the patent practice, the medium 120 may not be the telecommunications signal. In an example embodiment, the medium 120 may be a non-transitory computer readable storage medium.

Figure 4:
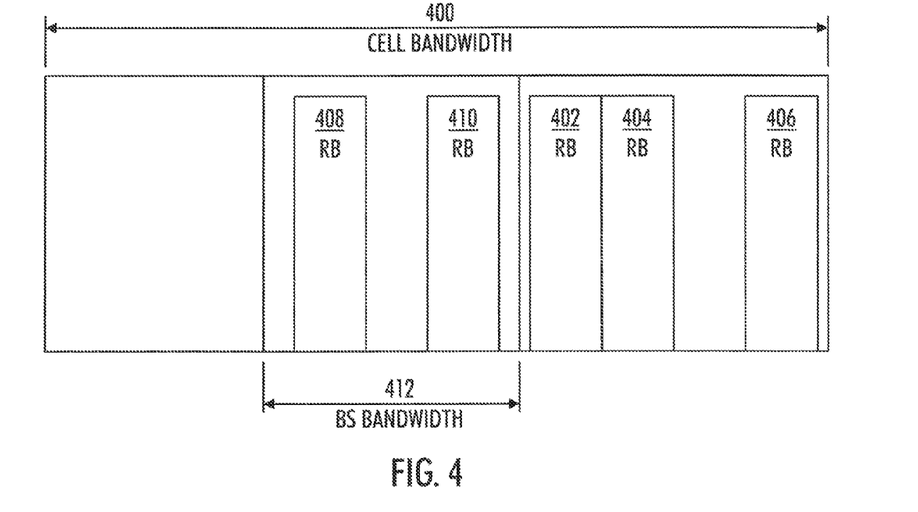
FIG. 4 illustrates example embodiments of bandwidths.

FIG. 4 illustrates example embodiments of bandwidths. BS bandwidth 412 of the base station 112 is smaller than the cell bandwidth 400 of the existing cells. In this example embodiment, the base station 112 uses two radio resource blocks 408 and 410, and the existing cells use radio resource blocks 402, 404 and 406. Use of smaller bandwidth has multiple benefits. The RF components 206, 208, 210, 212, 214 may be much smaller in size, use less power and their weight is smaller. In addition, the smaller bandwidth makes it possible to use less powerful processor(s) 102 running the physical layer software 218. The smaller bandwidth enables larger cell size of the base station 112 when running with batteries. The smaller bandwidth of the base station 112 also causes less interference to other cells, enabling the normal operation of the real cells. In an example embodiment, the bandwidths of the LTE are: 1.4, 3, 5, 10, 15, and 20 MHz. Accordingly, if the cell bandwidth 400 is 20 MHz, the BS bandwidth 412 may be 10 or 5 MHz (or even 15, 5, 3 or 1.4 MHz).

In an example embodiment, the one or more memories 102 and the computer program code 104 are further configured to, with the one or more processors 102, cause the apparatus 100 further to perform: control 154 the base station 112 to form the emulated LTE cell 130 such that the frequency band 412 of the emulated LTE cell 130 is narrower than the full channel bandwidth 400 employed by the real neighbouring LTE cells 500-514.

In an example embodiment, the one or more memories 102 and the computer program code 104 are further configured to, with the one or more processors 102, cause the apparatus 100 further to perform: control 154 the base station 112 to form the emulated LTE cell 130 such that the bandwidth of the frequency band 412 of the emulated LTE cell 130 is dynamically adjusted on the basis of the number of the active subscriber terminals 140 within the emulated LTE cell 130. In an example embodiment, the one or more memories 102 and the computer program code 104 are further configured to, with the one or more processors 102, cause the apparatus 100 further to perform: control 154 the base station 112 to form the emulated LTE cell 130 such that the bandwidth of the frequency band 412 of the emulated LTE cell 130 is dynamically adjusted on the basis of the number of the active subscriber terminals 140 within the emulated LTE cell 130 such that the tendency of the adjustment is for the broader bandwidth if there are more subscriber terminals 140 and for the narrower bandwidth if there are less subscriber terminals 140. Such a tendency may be implemented by utilizing thresholds, classifications or formulas for the number of the subscriber terminals 140. If the number of the subscriber terminals 140 is over a predetermined threshold, a predetermined bandwidth may be utilized. A number of thresholds may be utilized in such a way. The number of the subscriber terminals 140 may be divided into predetermined classes each class being appointed a certain bandwidth. A simple mathematical formula may be utilized as well for calculation of the bandwidth.

Figure 6:
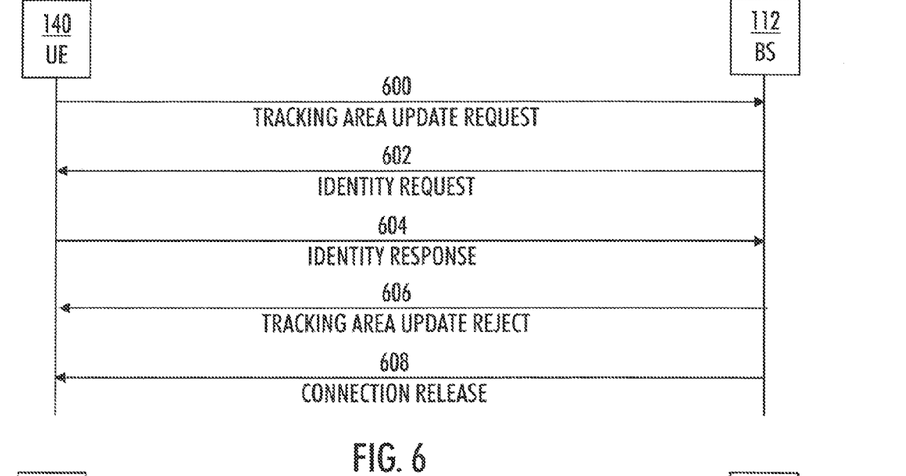
FIGS. 6 and 7 illustrate example embodiments of signal sequences.

In an example embodiment, the one or more memories 102 and the computer program code 104 are further configured to, with the one or more processors 102, cause the apparatus 100 further to perform at least some of the following: control 154 the base station 112 to receive the connection request 156 including a tracking area update request from the subscriber terminal 140; control 154 the base station 112 to transmit an identity request to the subscriber terminal 140; control 154 the base station 112 to receive the international mobile subscriber identity in an identity response 156 from the subscriber terminal 140; control 154 the base station 112 to transmit a tracking area update reject 156 to the subscriber terminal 140 in response to the identity response received from the subscriber terminal 140. In FIG. 6, the basic identity catching sequence is illustrated. The UE 140 detects that it has moved to a new tracking area of the BS 112, and the cell selection criteria of the 3GPP TS 36.304 is fulfilled. The UE 140 sends a tracking area update request 600 to the BS 112. The BS 112 replies to the UE 140 with the identity request 602. The UE 140 replies to the BS 112 with the identity response 604. The response contains the IMSI of the UE 140. The BS 112 may also request the IMEI of the UE 140 using another identity request. Next, the BS 112 replies to the UE 140 with the tracking area update reject 606. The reason is typically "no suitable cells in tracking area", which causes the UE 140 ignore the emulated LTE cell of the BS 112. The BS 112 sends a connection release 608 to the UE 140, thereby ending the communication with the UE 140.

The UE 140 may also send other messages to the BS 112 instead of the tracking area update request 600. If the UE 140 sends an attach request, service request or extended service request to the BS 112, the BS 112 requests identity from the UE 140, and rejects the received requests and closes the connection.

Figure 7:
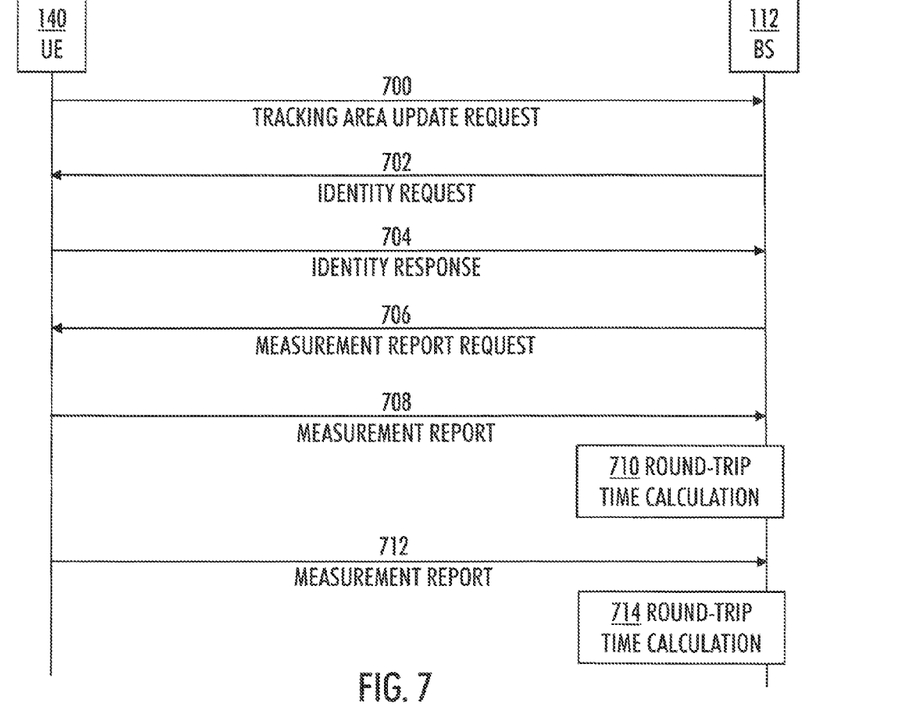

In FIG. 7, the basic direction finding of the UE 140 is illustrated. The UE 140 detects that it has moved to a new tracking area of the BS 112, and the cell selection criteria of the 3GPP TS 36.304 is fulfilled. The UE 140 sends a tracking area update request 700 to the BS 112. The BS 112 replies to the UE 140 with the identity request 702. The UE 140 replies to the BS 112 with the identity response 704. The response contains the IMSI of the UE 140. The BS 112 may also request the IMEI of the UE 140 using another identity request. Next, the BS 112 sends a measurement report request 706 to the UE 140. Even if the integrity protection is not active, the UE 140 starts sending measurement reports 708, 712. The measurement report 708, 712 contains the received power level of the BS 112 transmission and the quality of the received transmission of the BS 112. The BS 112 calculates the round-trip-time 710, 714 in the physical layer software. This continues until the BS 112 closes the connection to the UE 140. Based on the measurement reports 708, 712 and the round-trip-time information 710, 712, the BS 112 may calculate distance estimates from the BS 112 to the UE 140 and estimate direction of the UE 140 transmission. This information may be used in the direction finding process.

In an example embodiment, the one or more memories 102 and the computer program code 104 are further configured to, with the one or more processors 102, cause the apparatus 100 further to perform: cause the apparatus 100 to control a direction finder to find out the geographical location of the subscriber terminal 140 utilizing the radio connection 156 with the subscriber terminal 140. The base station 112 may also be used as the direction finder. A bearing to the subscriber terminal 140 may be taken by turning the directional antenna of the base station 112. The directional antenna may be turned physically, or a directed antenna beam may be rotated through signal processing. The subscriber terminal 140 is in the direction wherefrom measurement reports indicate maximum reception level. The measurement reports of the subscriber terminal 140 report how much power it uses to keep a set SIR target. The lower the power value, the better the antenna is directed towards the subscriber terminal 140. The report values may be presented in the user interface 320 so that the highest bars are reached with the lowest power values. The roundtrip time measurement may also be started for estimating the distance to the subscriber terminal 140.

Figure 8:
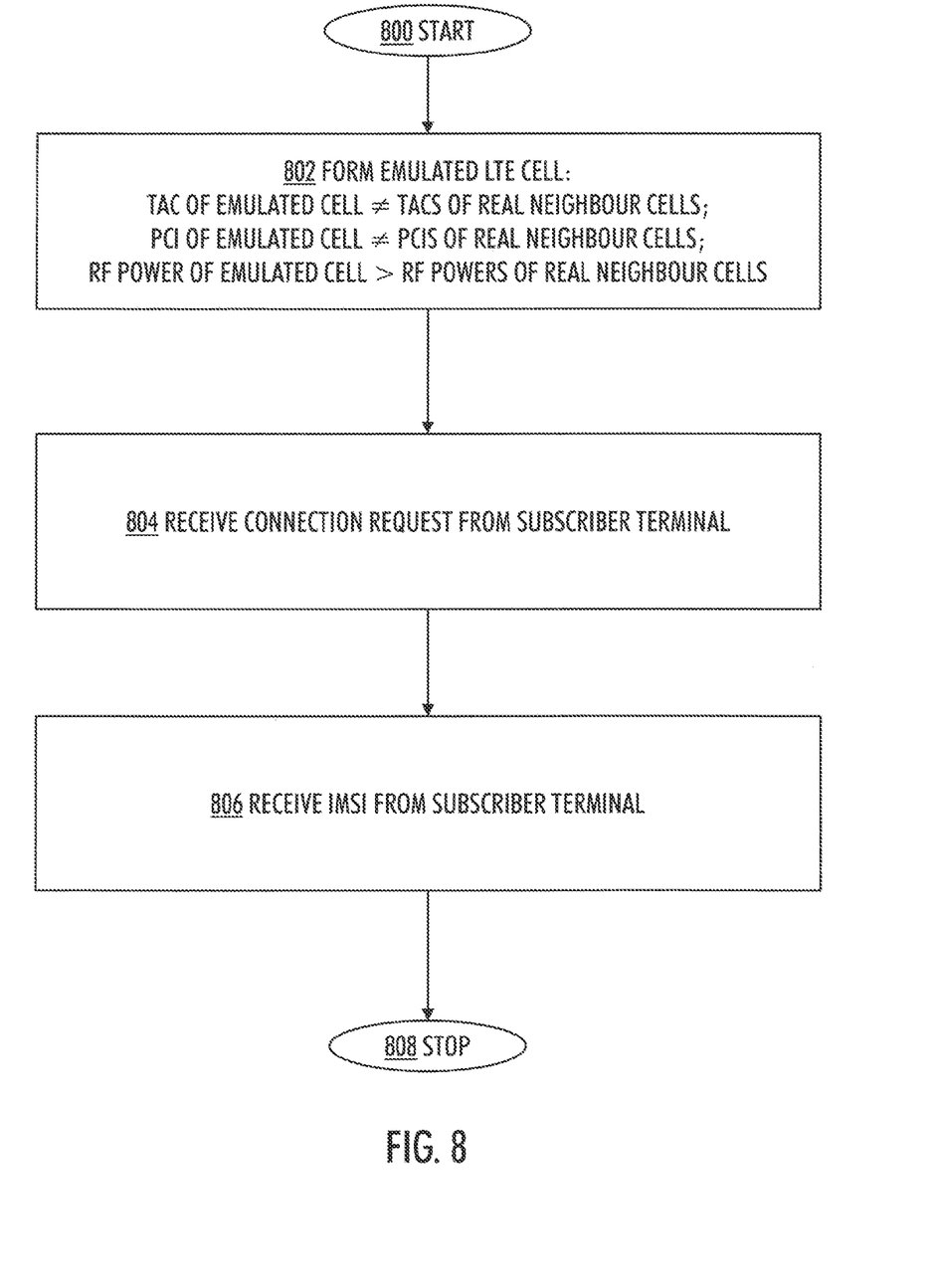
FIG. 8 is a flow chart illustrating example embodiments of a method.

Next, example embodiments of a method will be described with reference to FIG. 8. Other functions, not described in this application, may also be executed between the operations or within the operations. Some of the operations or parts of the operations may also be left out or replaced by a corresponding operation or part of the operation.

The method starts in 800.

In 802, an emulated long term evolution LTE cell is formed such that tracking area code and physical cell identity of the emulated LTE cell are unused by real neighbouring LTE cells, and radio frequency power level of the emulated LTE cell within the emulated LTE cell is higher than the radio frequency power levels of the real neighbouring LTE cells within the emulated LTE cell.

In 804, a connection request from a subscriber terminal residing in the emulated LTE cell is received, whereupon, in the ensuing exchange of messages, an international mobile subscriber identity is received from the subscriber terminal in 806.

In an example embodiment, the previous two operations may be implemented by a base station controlled to form the emulated LTE cell and receive the connection request and the IMSI.

The method ends in 808.

The embodiments of the earlier described apparatus 100 may also be used to enhance the method. In an example embodiment, the method may be implemented in the apparatus 100 described earlier. In an embodiment, a computer program comprises instructions 122, which, when loaded into the apparatus 100, cause the apparatus 100 to perform the described process and its further example embodiments. In an embodiment, a computer readable storage medium comprises the computer program.

Next, further example embodiments of the method will be described. These example embodiments may be freely combined with each other in order to produce further example embodiments for the method.

In an example embodiment, the method further comprises: measuring radio frequency power levels of the real neighbouring LTE cells; and selecting radio frequency transmission power of the emulated LTE cell on the basis of the measured radio frequency power levels of the real neighbouring LTE cells.

In an example embodiment, the method further comprises: obtaining network information of the real neighbouring LTE cells; and selecting the tracking area code and the physical cell identity of the emulated LTE cell on the basis of the obtained network information of the real neighbouring LTE cells.

In an example embodiment, the method further comprises: obtaining blacklist of physical cell identities; and selecting the physical cell identity of the emulated LTE cell such that the selected physical cell identity of the emulated LTE cell is not in the blacklist of the physical cell identities.

In an example embodiment, the previous three example embodiments may be implemented by a measurement transceiver controlled to measure/obtain the mentioned information.

In an example embodiment, the method further comprises: forming the emulated LTE cell such that the frequency band of the emulated LTE cell is narrower than the full channel bandwidth employed by the real neighbouring LTE cells.

In an example embodiment, the method further comprises: forming the emulated LTE cell such that the bandwidth of the frequency band of the emulated LTE cell is dynamically adjusted on the basis of the number of the active subscriber terminals within the emulated LTE cell.

In an example embodiment, the method further comprises: forming the emulated LTE cell such that the bandwidth of the frequency band of the emulated LTE cell is dynamically adjusted on the basis of the number of the active subscriber terminals within the emulated LTE cell such that the tendency of the adjustment is for the broader bandwidth if there are more subscriber terminals and for the narrower bandwidth if there are less subscriber terminals.

In an example embodiment, the previous three example embodiments may be implemented by a base station controlled to form the emulated LTE cell.

In an example embodiment, the method further comprises: interfering the real neighbouring LTE cells so that the subscriber terminal is caused to measure reception of the base station forming the emulated LTE cell as being better than reception of the real neighbouring LTE cells.

In an example embodiment, the previous example embodiment may be implemented by an interference transmitter controlled to interfere.

In an example embodiment, the method further comprises: in the ensuing exchange of the messages, receiving an international mobile equipment identity from the subscriber terminal.

In an example embodiment, the previous example embodiment may be implemented by a base station controlled to receive the IMEI.

In an example embodiment, the method further comprises: receiving the connection request including a tracking area update request from the subscriber terminal; transmitting an identity request to the subscriber terminal; receiving the international mobile subscriber identity in an identity response from the subscriber terminal; transmitting a tracking area update reject to the subscriber terminal in response to the identity response received from the subscriber terminal.

In an example embodiment, the previous example embodiment may be implemented by a base station controlled to perform the operation(s).

It will be obvious to a person skilled in the art that, as technology advances, the inventive concept can be implemented in various ways. The invention and its embodiments are not limited to the example embodiments described above but may vary within the scope of the claims.

The invention claimed is:

1. An apparatus comprising
one or more processors, and
one or more memories including computer program code,
the one or more memories and the computer program code configured to, with the one or more processors, cause the apparatus at least to:
control a base station to form an emulated long term evolution LTE fake cell such that tracking area code and physical cell identity of the emulated LTE fake cell are unused by real neighbouring LTE cells, and radio frequency power level of the emulated LTE fake cell within the emulated fake LTE cell is higher than the radio frequency power levels of the real neighbouring LTE cells within the emulated LTE fake cell; and
control the base station to receive a connection request from a subscriber terminal residing in the emulated LTE fake cell as a result of the subscriber terminal detecting it has moved to a new tracking area of the base station fulfilling the cell selection criteria in idle mode on the basis of the received emulated LTE fake cell, whereupon, in the ensuing exchange of messages, the base station is controlled to receive an international mobile subscriber identity from the subscriber terminal;
control the base station to form the emulated LTE fake cell such that the frequency band of the emulated LTE fake cell is narrower than the full channel bandwidth employed by the real neighbouring LTE cells;
control a measurement transceiver to obtain network information of the real neighbouring LTE cells; and
select the tracking area code and the physical cell identity of the emulated LTE fake cell on the basis of the obtained network information of the real neighbouring LTE cells.

2. The apparatus of claim 1, wherein the one or more memories and the computer program code are further configured to, with the one or more processors, cause the apparatus further to perform:
control a measurement transceiver to measure radio frequency power levels of the real neighbouring LTE cells; and
select radio frequency transmission power of the emulated LTE fake cell on the basis of the measured radio frequency power levels of the real neighbouring LTE cells.

3. The apparatus of claim 1, wherein the one or more memories and the computer program code are further configured to, with the one or more processors, cause the apparatus further to perform:
control a measurement transceiver to obtain blacklist of physical cell identities; and
select the physical cell identity of the emulated LTE fake cell such that the selected physical cell identity of the emulated LTE fake cell is not in the blacklist of the physical cell identities.

4. The apparatus of claim 1, wherein the one or more memories and the computer program code are further configured to, with the one or more processors, cause the apparatus further to perform:
control the base station to form the emulated LTE fake cell such that the bandwidth of the frequency band of the emulated fake LTE cell is dynamically adjusted on the basis of the number of the active subscriber terminals within the emulated fake LTE cell.

5. The apparatus of claim 4, wherein the one or more memories and the computer program code are further configured to, with the one or more processors, cause the apparatus further to perform:
control the base station to form the emulated fake LTE cell such that the bandwidth of the frequency band of the emulated fake LTE cell is dynamically adjusted on the basis of the number of the active subscriber terminals within the emulated fake LTE cell such that the tendency of the adjustment is for the broader bandwidth if there are more subscriber terminals and for the narrower bandwidth if there are less subscriber terminals.

6. The apparatus of claim 1, wherein the one or more memories and the computer program code are further configured to, with the one or more processors, cause the apparatus further to perform:
control an interference transmitter to interfere the real neighbouring LTE cells so that the subscriber terminal is caused to measure reception of the base station forming the emulated LTE fake cell as being better than reception of the real neighbouring LTE cells.

7. The apparatus of claim 1, wherein the one or more memories and the computer program code are further configured to, with the one or more processors, cause the apparatus further to perform:
control the base station, in the ensuing exchange of the messages, to receive an international mobile equipment identity from the subscriber terminal.

8. The apparatus of claim 1, wherein the one or more memories and the computer program code are further configured to, with the one or more processors, cause the apparatus further to perform at least some of the following:
control the base station to receive the connection request including a tracking area update request from the subscriber terminal;
control the base station to transmit an identity request to the subscriber terminal;
control the base station to receive the international mobile subscriber identity in an identity response from the subscriber terminal;
control the base station to transmit a tracking area update reject to the subscriber terminal in response to the identity response received from the subscriber terminal.

9. A method comprising:
forming an emulated long term evolution LTE fake cell such that tracking area code and physical cell identity of the emulated LTE fake cell are unused by real neighbouring LTE cells, and radio frequency power level of the emulated LTE fake cell within the emulated LTE fake cell is higher than the radio frequency power levels of the real neighbouring LTE cells within the emulated LTE fake cell; and
receiving a connection request from a subscriber terminal residing in the emulated LTE fake cell as a result of the subscriber terminal detecting it has moved to a new tracking area of the base station fulfilling the cell selection criteria in idle mode on the basis of the received emulated LTE fake cell, whereupon, in the ensuing exchange of messages, receiving an international mobile subscriber identity from the subscriber terminal;
controlling the base station to form the emulated LTE fake cell such that the frequency band of the emulated LTE fake cell is narrower than the full channel bandwidth employed by the real neighbouring LTE cells;
controlling a measurement transceiver to obtain network information of the real neighbouring LTE cells; and
selecting the tracking area code and the physical cell identity of the emulated LTE fake cell on the basis of the obtained network information of the real neighbouring LTE cells.

10. A non-transitory computer readable medium comprising a set of instructions, which, when executed on an apparatus cause the apparatus to perform:

forming an emulated long term evolution LTE fake cell such that tracking area code and physical cell identity of the emulated LTE fake cell are unused by real neighbouring LTE cells, and radio frequency power level of the emulated LTE fake cell within the emulated LTE fake cell is higher than the radio frequency power levels of the real neighbouring LTE cells within the emulated LTE fake cell; and receiving a connection request from a subscriber terminal residing in the emulated LTE cell as a result of the subscriber terminal detecting it has moved to a new tracking area of the base station fulfilling the cell selection criteria in idle mode on the basis of the received emulated LTE fake cell, whereupon, in the ensuing exchange of messages, receiving an international mobile subscriber identity from the subscriber terminal;

controlling the base station to form the emulated LTE fake cell such that the frequency band of the emulated LTE fake cell is narrower than the full channel bandwidth employed by the real neighbouring LTE cells;

controlling a measurement transceiver to obtain network information of the real neighbouring LTE cells; and selecting the tracking area code and the physical cell identity of the emulated LTE fake cell on the basis of the obtained network information of the real neighbouring LTE cells.

* * * * *